United States Patent
Sato et al.

(10) Patent No.: US 10,507,436 B2
(45) Date of Patent: Dec. 17, 2019

(54) POLYOLEFIN MICROPOROUS MEMBRANE, METHOD FOR PRODUCING SAME, AND BATTERY SEPARATOR

(71) Applicant: TORAY INDUSTRIES, INC., Tokyo (JP)

(72) Inventors: Go Sato, Tochigi (JP); Toshihiko Kaneda, Tochigi (JP); Koichi Kono, Tochigi (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 15/539,972

(22) PCT Filed: Dec. 25, 2015

(86) PCT No.: PCT/JP2015/086415
§ 371 (c)(1),
(2) Date: Jun. 26, 2017

(87) PCT Pub. No.: WO2016/104789
PCT Pub. Date: Jun. 30, 2016

(65) Prior Publication Data
US 2017/0341035 A1    Nov. 30, 2017

(30) Foreign Application Priority Data

Dec. 26, 2014  (JP) ................................ 2014-266009
Jun. 5, 2015   (JP) ................................ 2015-115091

(51) Int. Cl.
*B01D 71/26* (2006.01)
*C08J 9/28* (2006.01)
*H01M 2/16* (2006.01)
*C08F 10/06* (2006.01)
*H01M 10/0525* (2010.01)
*H01M 2/14* (2006.01)

(52) U.S. Cl.
CPC .............. *B01D 71/26* (2013.01); *C08F 10/06* (2013.01); *C08J 9/28* (2013.01); *H01M 2/145* (2013.01); *H01M 2/16* (2013.01); *H01M 2/1653* (2013.01); *H01M 10/0525* (2013.01)

(58) Field of Classification Search
CPC ..... H01M 2/16; H01M 10/0525; C08F 10/06; C08J 9/28; B01D 71/26
See application file for complete search history.

(56) References Cited

FOREIGN PATENT DOCUMENTS

| EP | 2306552 A1 * | 4/2011 | ............ H01M 2/166 |
|----|--------------|--------|------------------------|
| EP | 2306552 A1   | 4/2011 |                        |
| JP | H05-222236 A | 8/1993 |                        |

(Continued)

OTHER PUBLICATIONS

Extended European Search Report dated Nov. 2, 2017 in European Patent Application No. 15873357.6, 7 pages.

*Primary Examiner* — Karie O'Neill Apicella
(74) *Attorney, Agent, or Firm* — Kilpatrick Townsend & Stockton LLP

(57) ABSTRACT

A polyolefin microporous membrane is disclosed. The polyolefin microporous membrane includes a polyolefin resin, where the polyolefin resin contains at least 80 mass % polypropylene resin, and where the polyolefin microporous membrane has a maximum pore size of less than 30.0 nm and a mean flow pore size of less than 20.0 nm.

9 Claims, 2 Drawing Sheets

(56) References Cited

FOREIGN PATENT DOCUMENTS

| | | | | | |
|---|---|---|---|---|---|
| JP | H05-222237 | A | | 8/1993 | |
| JP | H06-223802 | A | | 8/1994 | |
| JP | H06223802 | | * | 8/1994 | ............... H01G 9/02 |
| JP | H08-012799 | A | | 1/1996 | |
| JP | H0812799 | A | * | 1/1996 | ............... C08J 9/00 |
| JP | 2002/256099 | A | | 9/2002 | |
| JP | 3347835 | B | | 11/2002 | |
| JP | 3347854 | B | | 11/2002 | |
| JP | 2007-518832 | A | | 7/2007 | |
| JP | 2009-527633 | T | | 7/2009 | |
| JP | 2010-215901 | A | | 9/2010 | |
| WO | 2006/137540 | A1 | | 12/2006 | |
| WO | 2010/079799 | A1 | | 7/2010 | |

* cited by examiner

POLYOLEFIN MICROPOROUS MEMBRANE, METHOD FOR PRODUCING SAME, AND BATTERY SEPARATOR

CROSS-REFERENCE TO RELATED APPLICATIONS

This application is a United States National Phase Application of co-pending International Patent Application Number PCT/US2015/086415, filed Dec. 25, 2015 and entitled "POLYOLEFIN MICROPOROUS MEMBRANE, METHOD FOR PRODUCING SAME, AND BATTERY SEPARATOR," which Application claims priority to Japanese Patent Application Number 2015-115091, filed with the Japanese Patent Office on Jun. 5, 2015 and Japanese Patent Application Number 2014-0266009, filed with the Japanese Patent Office on Dec. 26, 2014, the contents of which are incorporated herein by reference in their entirety.

TECHNICAL FIELD

The present invention relates to a polyolefin microporous membrane, a method of producing the same, and a battery separator, and particularly relates to a polyolefin microporous membrane that has excellent oxidation resistance, impedance characteristics, and withstand voltage characteristics and that can be suitably used in a battery separator; a method of producing the same; and a battery separator.

BACKGROUND ART

In recent years, as lithium ion rechargeable batteries achieve higher output density and higher capacity, battery separator films having excellent oxidation resistance and withstand voltage characteristics have been demanded.

JP-A5-222237 describes a polyolefin microporous membrane produced by forming a gel-like composition by cooling a polyolefin solution obtained by melt-mixing a nucleating agent, a mixed solvent of a good solvent for polyolefin and a solvent having excellent dispersibility for the nucleating agent, and polyolefin; heating and stretching the gel-like composition; and then removing the remained solvent. Since a mixed solvent is used in such a polyolefin microporous membrane, the solvent is not uniformly dispersed in the polyolefin solution, thereby increasing both the maximum pore size and the mean flow pore size of the obtained polyolefin microporous membrane measured by a porometer and also reducing air permeation resistance. Therefore, for use as a separator of a battery, withstand voltage characteristics need to be further enhanced.

JP-A-2010-215901 and JP-T-2009-527633 disclose polypropylene porous films obtained by production methods known as dry methods. Specifically, these are methods which employ low temperature extrusion and high draft ratio during melt extrusion to control a lamella structure in a film that has been formed into a sheet and that is prior to stretching, and which form voids by stretching such a film. However, by such production methods, the pore structure tends to be uneven and a structure with locally arranged voids may be formed. In particular, there has been a problem of poor dielectric breakdown resistance characteristics due to increased pore size of the pores on the surface of the microporous membrane and uneven distribution thereof.

JP-A-6-223802 describes a microporous membrane formed from a mixture of a high molecular weight polyethylene and high molecular weight polypropylene. However, since such a microporous membrane is structured mainly by polyethylene, although the impedance thereof is low, further enhancement in oxidation resistance is required.

CITATION LIST

Patent Literature

Patent Document 1: JP-A-5-222237
Patent Document 2: JP-A-2010-215901
Patent Document 3: JP-T-2009-527633
Patent Document 4: JP-A-6-223802

SUMMARY OF INVENTION

Technical Problem

An object of the present invention is to provide a polyolefin microporous membrane having excellent oxidation resistance and withstand voltage characteristics and a battery separator.

Solution to Problem

The first aspect of the present invention is a polyolefin microporous membrane formed from a polyolefin resin containing 80 mass % or greater of a polypropylene resin, and having a maximum pore size of less than 30.0 nm and a mean flow pore size of less than 20.0 nm that are measured by a porometer.

The polyolefin resin preferably contains 90 mass % or greater of a polypropylene resin, and the weight average molecular weight of the polypropylene resin is preferably from $1\times10^5$ to $1\times10^8$.

The maximum pore size of a pore on a surface of the polyolefin microporous membrane is preferably 300 nm or less.

In the polyolefin microporous membrane, the porosity is preferably from 20 to 80%, the impedance is preferably 15.0 $\Omega \cdot cm^2$ or less, and, when a membrane thickness is 20 μm, the air permeation resistance is preferably 300 sec/100 cc or greater.

The second aspect of the present invention is a battery separator formed from the polyolefin microporous membrane, and the third aspect of the present invention is a rechargeable battery including the separator.

The fourth aspect of the present invention is a method of producing a polyolefin microporous membrane having a maximum pore size of less than 30.0 nm and a mean flow pore size of less than 20.0 nm, the method including steps (1) to (5) below:

(1) a step of preparing a polyolefin solution by melt-kneading a polyolefin resin containing 80 mass % or greater of the polypropylene resin, a crystallization controlling agent, and a solvent for membrane formation;
(2) a step of forming a gel sheet by extruding and cooling the polyolefin solution;
(3) a stretching step of stretching the gel sheet;
(4) a step of removing the solvent for membrane formation from the gel sheet after the stretching; and
(5) a step of drying the sheet after removing the solvent for membrane formation.

Advantageous Effects of Invention

Since the polyolefin microporous membrane of the present invention contains a polypropylene as a main component and a fine and uniform porous structure, the polyolefin microporous membrane has excellent impedance characteristics, excellent oxidation resistance, and excellent withstand voltage characteristics. The method of producing the polyolefin microporous membrane of the present invention can efficiently produce the polyolefin microporous membrane having excellent impedance characteristics, excellent oxidation resistance, and excellent withstand voltage characteristics. Since the battery separator of the present invention is formed from the polyolefin microporous membrane having excellent impedance characteristics, excellent oxidation resistance, and excellent withstand voltage characteristics, when used in a battery such as a lithium ion rechargeable battery, the battery separator of the present invention is expected to provide longer life of the battery, better charge/discharge cycle characteristics, and enhanced safety.

DESCRIPTION OF EMBODIMENTS

Figure 1:
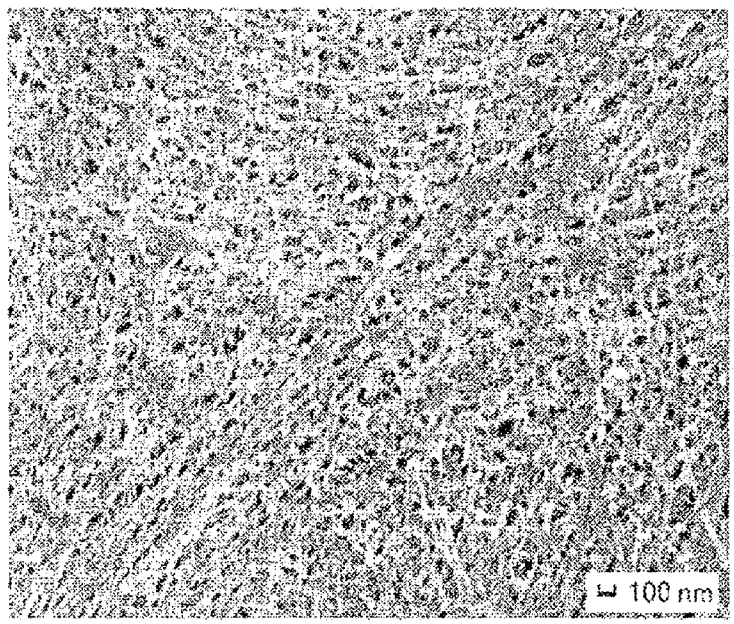
FIG. 1 is an SEM image of the microporous membrane obtained in Example 4 of the present application.
Figure 2:
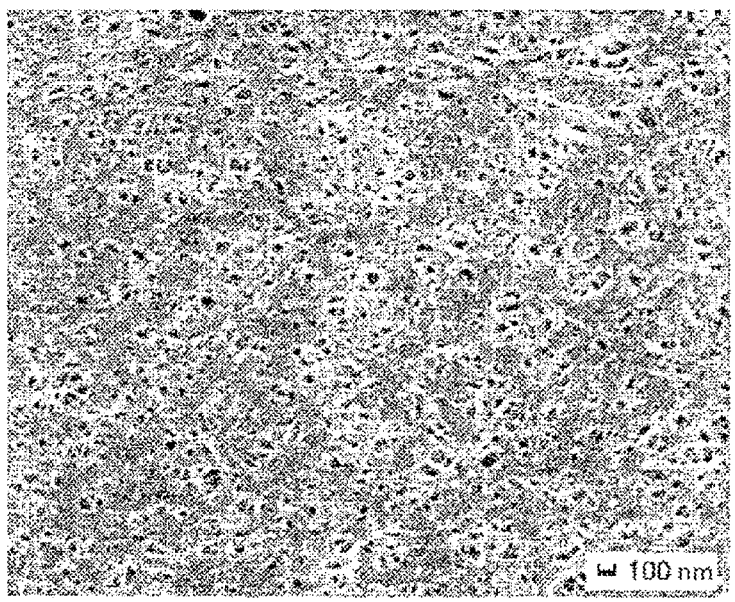
FIG. 2 is an SEM image of the microporous membrane obtained in Example 7 of the present application.
Figure 3:
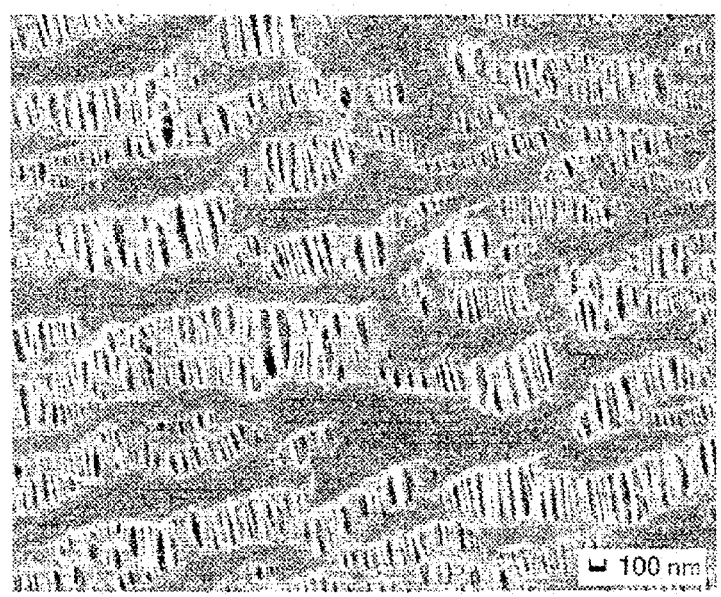
FIG. 3 is an SEM image of the microporous membrane obtained in Comparative Example 1 of the present application.
Figure 4:
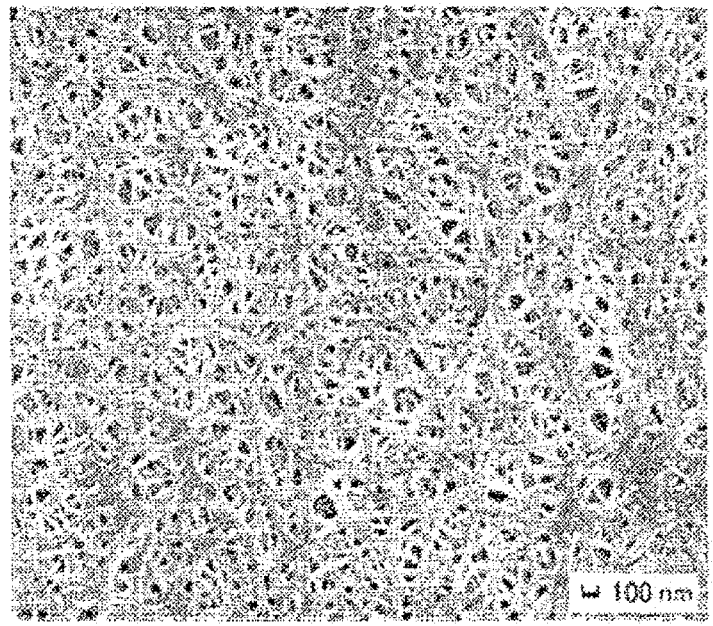
FIG. 4 is an SEM image of the microporous membrane obtained in Comparative Example 2 of the present application.

1. Polyolefin Microporous Membrane
The polyolefin microporous membrane of the present invention is formed from a polyolefin resin.
Each item of the present invention will be described below.
(1) Polyolefin Resin
The polyolefin resin contains a polypropylene resin as a main component. The content of the polypropylene resin in the polyolefin resin is preferably 80 mass % or greater, more preferably 90 mass % or greater, even more preferably 95 mass % or greater, and most preferably 100 mass %. When the content of the polypropylene resin in the polyolefin resin is less than the range described above, oxidation resistance of the polyolefin microporous membrane of the present invention deteriorates.
(i) Polypropylene Resin
The weight average molecular weight of the polypropylene resin is preferably from $1 \times 10^5$ to $1 \times 10^8$, and more preferably from $1 \times 10^6$ to $1 \times 10^8$. The molecular weight distribution of the polypropylene resin is preferably approximately from 5 to 10. When the weight average molecular weight of the polyolefin resin is within the range described above, handleability during the step of melt-kneading with a solvent for membrane formation and extruding is enhanced.
The melting point of the polypropylene resin is not particularly limited but is preferably 180° C. or lower.
The polypropylene resin may be a copolymer with another olefin but is preferably a homopolymer. Examples of the copolymer of polypropylene and another olefin include propylene-ethylene copolymers, propylene-butene copolymers, and propylene-hexene copolymers.
(ii) Polyolefin Resin Other Than Polypropylene
The polyolefin microporous membrane of the present invention may contain a little amount of polyolefin other than polypropylene such as polyethylene and polybutene, as the polyolefin resin. As such a polyolefin, at least one type selected from the group consisting of polyethylene having an Mw of $1 \times 10^4$ to $1 \times 10^6$, an ultrahigh molecular weight polyethylene having an Mw of $1 \times 10^6$ to $5 \times 10^6$, polybutene-1, polypentene-1, polyhexene-1, and polyoctene-1 each of which has an Mw of $1 \times 10^4$ to $4 \times 10^6$, and polyethylene waxes having an Mw of $1 \times 10^3$ to $1 \times 10^4$.
The content of the polyolefin other than the polypropylene resin described above in the polyolefin resin may be adjusted appropriately within a range that does not impair the effect of the present invention; however, the content is preferably 20 mass % or less, more preferably 10 mass % or less, and even more preferably less than 5 mass %, in the polyolefin resin.
(iii) Other Resin Components
The polyolefin resin may contain another resin component in addition to the polyolefin resin as necessary. A preferable example of the other resin components is a heat-resistant resin, and examples of the heat-resistant resin include crystalline resins (including partially crystalline resins) having a melting point of 150° C. or higher and/or amorphous resins having a glass transition point (Tg) of 150° C. or higher. Here, Tg is a value measured in accordance with JIS K7121.
Specific examples of the other resin components include polyesters, polymethylpentenes (PMP or transparent polymer X (TPX), melting point: 230 to 245° C.), polyamides (PA, melting point: 215 to 265° C.), polyarylene sulfides (PAS), fluorine-containing resins such as vinylidene fluoride homopolymers such as polyvinylidene fluoride (PVDF) or fluorinated olefins such as polytetrafluoroethylene (PTFE) and copolymers thereof; polystyrenes (PS, melting point: 230° C.), polyvinyl alcohols (PVA, melting point: 220 to 240° C.), polyimides (PI, Tg: not less than 280° C.), polyamideimides (PAI, Tg: 280° C.), polyether sulfones (PES, Tg: 223° C.), polyether ether ketones (PEEK, melting point: 334° C.), polycarbonates (PC, melting point: 220 to 240° C.), cellulose acetate (melting point: 220° C.), cellulose triacetate (melting point: 300° C.), polysulfones (Tg: 190° C.), and polyether imides (melting point: 216° C.). The resin components are not limited to a single resin component and may include a plurality of resin components. A preferable Mw of the other resin component differs depending on the type of the resin but is typically from $1 \times 10^3$ to $1 \times 10^6$ and is more preferably from $1 \times 10^4$ to $7 \times 10^5$. Furthermore, the content of the other resin component in the polyolefin resin is adjusted appropriately within a range that does not depart from the gist of the present invention; however, the content is 20 mass % or less, and preferably less than 5 mass %, in the polyolefin resin.
(2) Crystallization Controlling Agent
The crystallization controlling agent is an additive that promotes or suppresses crystallization of a polyolefin resin by being blended with the polyolefin resin. Examples thereof include nucleating agents, clarifiers, and crystallization retarders. Among these, nucleating agents and crystallization retarders are preferable. By the blending of the crystallization controlling agent, the pore structure of the polyolefin microporous membrane of the present invention is expected to be uniform and fine.
(i) Nucleating Agent
As the nucleating agent, nucleating agents for polypropylene resins can be suitably used, and nucleating agents that are typically used as nucleating agents for polyolefin resins, such as metal carboxylate-based nucleating agents such as aromatic metal phosphate-based nucleating agents and metal benzoate-based nucleating agent, sorbitol-based nucleating agents, and mixtures of these can be used. In particular, from the perspective of dispersibility in polyolefin resin solution described below, aromatic metal phosphate-based nucleating agents that, basically, does not contain a hydrosilyl group, metal carboxylate-based nucleating agents, such as metal benzoate-based nucleating agents, and mixtures of these are preferable. Note that, as the nucleating agent for polypropylene resins, a nucleating agent master batch formed from a plurality of components that are commercially available may be used.

Examples of the nucleating agent for polypropylene resins include α-nucleating agents, β-nucleating agents, and γ-nucleating agents, and from the perspective of tendency to form microscopic crystals, an α-nucleating agent is preferable. When a β-nucleating agent is used, coarse needle-like crystals may be formed.

Examples of the aromatic metal phosphate-based nucleating agent include sodium bis(4-tert-butylphenyl)phosphate and sodium 2,2'-methylene bis(4,6-di-tert-butylphenyl)phosphate.

Examples of the metal carboxylate-based nucleating agent include lithium benzoate, sodium benzoate, aluminum 4-tert-butylbenzoate, and sodium adipate.

Examples of the sorbitol-based nucleating agent include dibenzylidene sorbitol, bis(4-methylbenzylidene)sorbitol, and bis(3,4-dimethylbenzylidene)sorbitol.

The compounded amount of the nucleating agent is typically from 0.01 to 5.00 parts by mass, and preferably from 0.05 to 3.00 parts by mass, per 100 parts by mass of the polyolefin resin; however, the compounded amount is not particularly limited. The nucleating agent may be directly compounded in the polyolefin resin or may be compounded in the polyolefin resin as a "master batch" in which a polyolefin resin and a nucleating agent have been mixed in advance.

(ii) Crystallization Retarder

As the crystallization retarder of the polyolefin resin, amorphous polyolefin resins, low crystallinity polyolefin resins, and the like can be used. Among these, low crystallinity polypropylene resins or the like can be suitably used.

Specific examples of the amorphous polyolefin resin include polystyrene and polycarbonate. Specific examples of the low crystallinity polyolefin resin include random copolymers of ethylene-propylene, ethylene-butene, and the like, and low stereoregular polyolefins, such as atactic polypropylenes.

The compounded amount of the crystallization retarder is typically from 0.01 to 5.00 parts by mass, and preferably from 0.05 to 3.00 parts by mass, per 100 parts by mass of the polyolefin resin; however, the compounded amount is not particularly limited.

(3) Characteristics of Polyolefin Microporous Membrane

Since the polyolefin microporous membrane of the present invention has a maximum pore size of less than 30.0 nm and a mean flow pore size of less than 20.0 nm that are measured by porometer, excellent impedance characteristics and withstand voltage characteristics are achieved.

(i) Maximum Pore Size

The maximum pore size of the polyolefin microporous membrane of the present invention is less than 30.0 nm, preferably less than 29.0 nm, and particularly preferably 28.9 nm or less. The lower limit of the maximum pore size is not particularly limited; however, the lower limit may be 15.0 nm or less, and preferably 15.0 nm. By setting the maximum pore size to be within the range described above, excellent dielectric breakdown voltage can be set to the polyolefin microporous membrane. In the present specification, "maximum pore size" indicates the size of the maximum pore among all the through-holes distributed in the polyolefin microporous membrane and can be measured by the bubble point method using a porometer or the like.

When the polyolefin microporous membrane of the present invention is used as a separator, due to the small pore size, it is expected to achieve excellent withstand voltage performance in the battery, prevent partial short circuit (micro short circuit) due to dendrite deposition/growth, and enhance cycle characteristics of the battery.

(ii) Mean Flow Pore Size

The mean flow pore size of the polyolefin microporous membrane of the present invention is less than 20.0 nm, preferably 18.0 nm or less, more preferably 16.0 nm or less, and particularly preferably 15.0 nm or less. The lower limit of the mean flow pore size is not particularly limited and may be less than or equal to the measurement limit of the porometer. In particular, the mean flow pore size is more preferably from the measurement limit or less to 17.0 nm, and particularly preferably from the measurement limit or less to 15.0 nm. By setting the mean flow pore size to be within the range described above, dielectric breakdown voltage of the polyolefin microporous membrane can be made high. In the present specification, "mean flow pore size" indicates the mean flow pore size of all the through-holes distributed in the polyolefin microporous membrane and can be measured by porometer.

Examples of means to set the maximum pore size and the mean flow pore size to be within the ranges described above include a method by which a crystallization controlling agent is blended into a polyolefin resin and the stretching temperature during membrane formation is set to the range within the crystalline dispersion temperature of the polyolefin resin (Tcd) to Tcd+30° C. It is conceived that stretching stress during the stretching in the means described above uniformly affects the structure constituting the membrane, and thus the pore structure of the microporous membrane can be controlled.

Furthermore, from the perspective of adjusting the maximum pore size and the mean flow pore size of the polyolefin microporous membrane to be within the ranges described above, it is preferable to use a crystallization controlling agent that has high affinity with the polyolefin resin or to use a "master batch" in which a crystallization controlling agent is uniformly dispersed in advance in the polyolefin resin.

The maximum pore size and the mean flow pore size of the polyolefin microporous membrane of the present invention can be measured by the following method using a porometer. First, the relationship between air pressure and air flow rate is measured for each of a sample in a dry state (hereinafter, also simply referred to as "dry sample") and a sample in a wet state prepared by filling the pores with a measurement solution (hereinafter, also simply referred to as "wet sample") using a porometer, and a permeation curve for the dry sample (dry curve) and a permeation curve for the wet sample (wet curve) are obtained.

The wet sample in which the pores are filled with the measurement solution shows the same characteristics as those of a capillary filled with a liquid. When the wet sample is set in a porometer and the air pressure thereof is gradually increased, the measurement solution is extruded from the pore starting from the pores with larger sizes because the air pressure overcomes the surface tension of the measurement solution in the pore. As this proceeds, the amount of air flow is gradually increased and the sample become dry at the end. Therefore, the pore diameter can be calculated by measuring the pressure at the time when the liquid is extruded from the pore. Note that, if the form of the pore is a substantially cylindrical shape, the conditions that allow the air with the pressure P to enter the pore with a diameter D is expressed by the Washburn's equation shown in Equation 1 below, where the surface tension of the measurement solution is $\gamma$ and the contact angle of the measurement solution is $\theta$.

$$PD = 4\gamma \cos\theta \quad \text{(Equation 1)}$$

In particular, the measured point at which the first generation of a bubble is detected (measured point indicating the maximum pore size) is referred to as a bubble point. Examples of the standard measuring method of the bubble point include a method described in ASTM F316-86.

Furthermore, the mean flow pore size of the polyolefin microporous membrane of the present invention can be determined using the permeation curve (dry curve) for the dry sample and the permeation curve (wet curve) for the wet sample based on the half-dry method stipulated in ASTM E1294-89. The pressure at which the curvature with the slope of ½ of the permeation curve for the dry sample (dry curve) (half-dry curve) and the permeation curve of the wet sample (wet curve) intersect each other is determined as the mean flow pressure, and the mean flow pore size of the microporous membrane is calculated by substituting the mean flow pressure into the Equation 1 described above.

On the other hand, when the amount of air flow of the wet sample at the pressure Pj is Fw, j and the amount of air flow of the dry sample is Fd, j, cumulative filter flow (CFF; unit: %) and pore size frequency (PSF; unit: %) are calculated from the following equations.

$$CFF = [(Fw,j/Fd,j) \times 100] \quad \text{(Equation 2)}$$

$$PSF = (CFF)_{j+1} - (CFF)_j \quad \text{(Equation 3)}$$

(iii) Impedance

In the polyolefin microporous membrane of the present invention, the impedance at the time when the membrane thickness is 20 μm is preferably 15.0 $\Omega \cdot cm^2$ or less, and more preferably 13.0 $\Omega \cdot cm^2$ or less. Note that the impedance (I2) at the time when the membrane thickness is 20 μm indicates the impedance I2 calculated using the equation: I2=(I1×20)/T1, where the measured impedance is I1 for the microporous membrane having the membrane thickness T1 (μm). When the impedance of the polyolefin microporous membrane is within the range described above, it is expected that excellent cycle characteristics of the battery is achieved when the polyolefin microporous membrane is used as a battery separator.

The impedance of the polyolefin microporous membrane of the present invention can be measured using an impedance measuring device (SI1250, SI1287, manufactured by Solartron). Specifically, the impedance at 1.0 kHz ($\Omega \cdot cm^2$) is determined in the measurement condition of 10 mA by performing a measurement by placing, in between electrodes which is provided with an Ni foil (30 mm×20 mm) on a glass plate (50 mm (W)×80 mm (L)×3 mm (T)), a microporous membrane (30 mm (W)×20 mm (L)) and 0.02 mL of an electrolytic solution using 1 mol/L of $LiPF_6$ with ethylene carbonate:ethyl methyl carbonate=(4:6) as a solvent.

(iv) Dielectric Breakdown Voltage

In the polyolefin microporous membrane of the present invention, the dielectric breakdown voltage is preferably from 0.10 to 0.30 kV/μm, more preferably from 0.15 to 0.25 kV/μm, and particularly preferably from 0.18 to 0.21 kV/μm. When the dielectric breakdown voltage of the polyolefin microporous membrane is within the range described above, it is expected that excellent withstand voltage performance and excellent durability of the battery are achieved when the polyolefin microporous membrane is used as a battery separator.

The dielectric breakdown voltage of the polyolefin microporous membrane of the present invention can be measured in accordance with methods stipulated in JIS C2110 and ASTM D149, for example.

(v) Porosity

The porosity of the polyolefin microporous membrane of the present invention is preferably from 20 to 80%. The porosity within the range described above is preferable since excellent impedance and strength of the microporous membrane can be achieved. The porosity is more preferably from 30 to 65%, and particularly preferably from 40 to 45%.

(vi) Air Permeation Resistance

In the polyolefin microporous membrane of the present invention, when the membrane thickness is 20 μm, the air permeation resistance is preferably 300 sec/100 cc or greater and 5000 sec/100 cc or less, more preferably 4000 sec/100 cc or less, and particularly preferably 3500 sec/100 cc or less. Note that the air permeation resistance at a membrane thickness of 20 μm refers to the air permeation resistance $P_2$ calculated from the equation: $P_2=(P_1 \times 20)/T_1$, where $P_1$ is the air permeation resistance measured in accordance with JIS P 8117 (2009) for a microporous membrane having a membrane thickness $T_1$ (μm). When the air permeation resistance of the polyolefin microporous membrane is within the range described above, it is advantageous from the perspectives of withstand voltage characteristics and impedance characteristics.

(vii) Oxidation Resistance

The oxidation resistance of the polyolefin microporous membrane of the present invention can be evaluated by degree of blackening of the separator. It is conceived that the blackening of the battery separator is caused by polymers becoming polyenes, the polymers being derived from radical chain oxidation reaction of polymers generated at the same time as the reduction of cobalt of the positive electrode in the battery. When the blackening proceeds, deterioration of membrane strength and a short circuit occur. While chain oxidation reactions proceed with polyethylene due to the molecular structure, polypropylene can be expected to exhibit effects to prevent the blackening (oxidation) due to its characteristics to stop chain reactions.

(viii) Maximum Pore Size of Surface Pores (Maximum Pore Size on Surface)

In the polyolefin microporous membrane of the present invention, the maximum pore size of the pore opened on the surface thereof is preferably 300 nm or less, more preferably 200 nm or less, and even more preferably 150 nm or less. When the longest pore size of pore openings recognized on the surface of the polyolefin microporous membrane observed in the range of 5 μm×5 μm is a major axis 1 and the longest pore size in a direction orthogonal to the major axis is a major axis 2 observed by SEM, the maximum pore size of the pores on the surface can be measured as the maximum major axis 1 among the observed pore openings. When the maximum pore size of the pores opened on the surface of the polyolefin microporous membrane is within the range described above, high dielectric breakdown voltage is achieved and thus it is advantageous to withstand voltage characteristics.

(ix) Crystal Melting Peak Derived from β-Crystal of Polypropylene Resin

The polyolefin microporous membrane of the present invention preferably has no crystal melting peak derived from β-crystal of the polypropylene resin in differential thermal analysis using a differential scanning calorimeter. In the present specification, "crystal melting peak" refers to a curve having the maximal value obtained by differential scanning calorimeter. Typically, a crystal melting peak derived from β-crystal of the polypropylene resin is detected when a β-nucleating agent is compounded; however, in this case, this is because the maximum pore size and/or the mean flow pore size of the polyolefin microporous membrane becomes greater. Typically, the crystal melting peak derived from β-crystal of the polypropylene resin is observed in the lower temperature side of the crystal melting peak derived from the α-crystal of the polypropylene resin. Specifically, for example, in the case of a polypropylene homopolymer, the peak is observed in a range of 140° C. or higher but lower than 160° C., and in the case of a random propylene ethylene copolymer in which from 1 to 4 mol % or ethylene is copolymerized, the peak is observed in a range of 120° C. or higher but lower than 140° C. The specific measurement method will be described below.

2. Production Method of Polyolefin Microporous Membrane

The method of producing the polyolefin microporous membrane of the present invention is not particularly limited as long as a polyolefin microporous membrane having the characteristics described above can be produced, and conventionally known methods can be used. For example, the methods described in JP-B-2132327, JPB-3347835, and WO 2006/137540 can be used. Specifically, the method preferably includes steps (1) to (5) below, may further includes a step (6) below, and, furthermore, may includes a step (7) below:

(1) a step of preparing a polyolefin solution by melt-kneading the polyolefin resin, the crystallization controlling agent, and the solvent for membrane formation;
(2) a step of forming a gel sheet by extruding and cooling the polyolefin solution;
(3) a first stretching step of stretching the gel sheet;
(4) a step of removing the solvent for membrane formation from the gel sheet after the stretching;
(5) a step of drying the sheet after removing the solvent for membrane formation;
(6) a second stretching step of stretching the sheet after the drying; and
(7) a step of heat-treating the sheet after the drying.

Each step will be described hereinafter.

(1) Preparation Step of Polyolefin Solution

A polyolefin solution is prepared by blending a polyolefin resin, a crystallization controlling agent, and an appropriate solvent for membrane formation and then melt-kneading the mixture. Methods using a twin-screw extruder described in JP-B-2132327 and JP-B-3347835 can be used as a melt-kneading method. Since melt-kneading methods are publicly known, description thereof is omitted.

The compounded proportions of the polyolefin resin and the solvent for membrane formation in the polyolefin solution are not particularly limited; however, from 50 to 80 parts by mass of the solvent for membrane formation is preferably contained per from 20 to 50 parts by mass of the polyolefin resin, and from 55 to 70 parts by mass of the solvent for membrane formation is preferably contained per from 30 to 45 parts by mass of the polyolefin resin.

When the polyolefin microporous membrane is produced using the polyolefin solution described above, it is preferable from the perspective of controlling membrane characteristics since excellent membrane forming processability can be achieved.

To enhance the formability of the extrudate, a crystallization controlling agent such as a nucleating agent and a crystallization retarder is compounded in the polyolefin solution. The compounded amount thereof is preferably from 0.01 to 5 parts by mass, and more preferably from 0.05 to 3 parts by mass, per 100 parts by mass of the polyolefin resin. When the compounded amount of the crystallization controlling agent is within the range described above, excellent handleability of the extrudate is achieved and a uniform stretched film can be obtained.

(2) Gel Sheet Forming Step

The polyolefin solution is fed from an extruder to a die to extrude it into a sheet form. A plurality of polyolefin solutions of the same or different compositions may be fed from the extruder to a single die, laminated therein into a layer shape, and extruded into a sheet shape.

The method of extrusion may be the flat die method or the inflation method. The extrusion temperature is preferably from 140 to 250° C., and the extrusion rate is preferably from 0.2 to 15 m/min. The membrane thickness can be adjusted by adjusting the extruded amount of the polyolefin solution.

Methods disclosed in JP-B-2132327 and JP-B-3347835 can be used as an extrusion method.

A gel sheet is formed by cooling the obtained extrudate. Methods disclosed in JP-B-2132327 and JP-B-3347835 can be used as a method of forming a gel sheet. Cooling is preferably performed at a rate of not less than 50° C./min up to at least the gelation temperature. Cooling is preferably performed up to not higher than 25° C.

(3) First Stretching Step

Next, the obtained gel sheet is stretched in at least a uniaxial direction. Since the gel sheet contains the crystallization controlling agent and the solvent for membrane formation, the gel sheet can be stretched uniformly. The gel sheet is preferably stretched at a prescribed magnification by a tenter method, a roll method, an inflation method, or a combination thereof after heating. Stretching may be uniaxial stretching or biaxial stretching, but biaxial stretching is preferable. In the case of biaxial stretching, simultaneous biaxial stretching, sequential stretching, or multi-stage stretching (for example, a combination of simultaneous biaxial stretching and sequential stretching) may be used.

The stretching magnification (area stretching magnification) in this step is preferably not less than 2 and more preferably from 3 to 30 in the case of uniaxial stretching. In the case of biaxial stretching, the stretching magnification is preferably not less than 9, more preferably not less than 16, and particularly preferably not less than 25. In addition, a stretching magnification of not less than 3 is preferable in both the machine and transverse directions (MD and TD), and the stretching magnifications in the MD and the TD may be same as or different from one another. When the stretching magnification is set to not less than 9, an enhancement in the pin puncture strength can be anticipated. Note that the stretching magnification in this step refers to the area stretching magnification of the microporous membrane immediately prior to being used in the next step, using the microporous membrane immediately prior to this step as a reference.

The stretching temperature in this step is preferably set to within the range of from the crystalline dispersion temperature (Tcd) of the polyolefin resin to Tcd+30° C., more preferably within the range of from the crystalline dispersion temperature (Tcd)+5° C. to the crystalline dispersion temperature (Tcd)+25° C., and particularly preferably within the range of from Tcd+10° C. to Tcd+20° C. When the stretching temperature is within the range described above, membrane puncture due to the stretching of the polyolefin resin is suppressed, and stretching can be performed with a high magnification, thereby making the pore structure of the obtained polyolefin microporous membrane fine and uniform.

The crystalline dispersion temperature (Tcd) is determined by temperature-characteristic measurement of the dynamic viscoelasticity in accordance with ASTM D4065. Since the polyolefin resin of the present invention has a crystalline dispersion temperature of approximately 110 to 130° C., the stretching temperature is preferably from 110 to 160° C., more preferably from 115 to 155° C., and even more preferably from 120 to 150° C.

Such stretching causes cleavage between polypropylene lamellae, and the polypropylene phase becomes finer, forming a large numbers of fibrils. The fibrils form an extremely fine mesh structure with three-dimensionally irregular linkages.

Depending on the desired physical properties, the stretching may be performed while the temperature distribution is present in a membrane thickness direction. Thereby, a microporous membrane having even better mechanical strength can be obtained. The details of this method are described in JP-B-3347854.

(4) Removal of Solvent for Membrane Formation

The solvent for membrane formation is removed (washed) using a washing solvent. The polyolefin phase is separated from the phase of the solvent for membrane formation, so when the solvent for membrane formation is removed, a porous membrane including fibrils forming a fine three-dimensional network structure and having pores (voids) which communicate three-dimensionally and irregularly is obtained. Washing solvents and methods of removing the solvent for membrane formation using the washing solvent has been publicly known, and thus explanation is omitted. For example, methods disclosed in JP-B-2132327 or JP-A-2002-256099 can be used.

(5) Drying

The microporous membrane from which the solvent for membrane formation has been removed is dried by a heat-drying or an air-drying. The drying temperature is preferably not higher than the crystalline dispersion temperature (Tcd) of the polyolefin resin and is particularly preferably at least 5° C. lower than the Tcd. Drying is preferably performed until the residual washing solvent is not greater than 5 mass % and more preferably not greater than 3 mass % on the basis of 100 mass % (dry weight) of the microporous membrane.

(6) Second Stretching Step

As necessary, the microporous membrane after being dried may be stretched in at least uniaxial direction. The stretching of the microporous membrane can be performed by a tenter method or the like in the same manner as described above while the microporous membrane is being heated. Stretching may be uniaxial stretching or biaxial stretching. In the case of biaxial stretching, simultaneous biaxial stretching or successive stretching can be performed.

The stretching temperature in this step is not particularly limited but is typically from 90 to 150° C., and more preferably from 95 to 145° C.

The lower limit of the stretching magnification (area stretching magnification) in the uniaxial direction at the time of the stretching of the microporous membrane in this step is preferably not less than 1.0, more preferably not less than 1.1, and even more preferably not less than 1.2. In addition, the upper limit is preferably not greater than 1.8. In the case of uniaxial stretching, the stretching magnification is from 1.0 to 2.0 in the MD or the TD. In the case of biaxial stretching, the lower limit of the area stretching magnification is preferably not less than 1.0, more preferably not less than 1.1, and even more preferably not less than 1.2. The upper limit is preferably not greater than 3.5. The stretching magnifications in the MD and the TD may respectively be set to from 1.0 to 2.0, and the stretching magnifications in the MD and the TD may be same as or different from one another. Note that the stretching magnification in this step refers to the stretching magnification of the microporous membrane immediately prior to being used in the next step using the microporous membrane immediately prior to this step as a reference.

(7) Heat Treatment

In addition, the microporous membrane after the drying may be subjected to heat treatment. Heat treatment causes crystal stabilization and lamella uniformization. Heat setting treatment and/or heat relaxation treatment may be used as a heat treatment method. The heat setting treatment is a heat treatment that heats in a manner that the size of a membrane is maintained and not changed. The heat relaxation treatment is a heat treatment in which the membrane is thermally shrunk in the MD and/or TD during the heating. Heat setting treatment is preferably performed by a tenter method or a roll method. For example, a method disclosed in JP-A-2002-256099 can be exemplified as the heat relaxation treatment method. The heat treatment temperature is preferably within the range of from Tcd to Tm of the polyolefin resin, more preferably within the range of ±5° C. of the stretching temperature of the microporous membrane, and particularly preferably within the range of ±3° C. of the second stretching temperature of the microporous membrane.

3. Multi-Layer Porous Membrane

Furthermore, a porous layer may be provided on at least one surface of the polyolefin microporous membrane to form a multi-layer porous membrane. An example of the porous layer is a porous layer formed using a filler-containing resin solution containing a filler and a resin binder or a heat-resistant resin solution.

An example of the filler is an inorganic filler such as alumina, silica, titania, or zirconia, or an organic filler such as a fluororesin particle or a crosslinked polymer filler, and a filler that has a melting point of 200° C. or higher, that has high electrical insulating properties, and that is electrochemically stable within the scope of use of a lithium ion rechargeable battery is preferable. One type of these may be used alone, or two or more types may be used in combination.

The average particle size of the filler is not particularly limited but is preferably not less than 0.1 μm and not greater than 3.0 μm.

The proportion of the filler in the porous layer (mass fraction) is preferably not less than 50% and not greater than 99.99% from the perspective of heat resistance.

A polyolefin or heat-resistant resin described in the section regarding other resin components contained in the polyolefin resin described above may be suitably used as the resin binder.

The proportion of the amount of resin binder out of the total amount of the filler and the resin binder is preferably not less than 0.5% and not greater than 8% in terms of the volume fraction from the perspective of the binding capacity of both components.

The same heat-resistant resins as those described in the section regarding other resin components contained in the polyolefin resin described above may be suitably used as the heat-resistant resin.

The method of applying the filler-containing resin solution or heat-resistant resin solution to the surface of the polyolefin microporous membrane is not particularly limited as long as the method is one with which the required layer thickness or coating area can be achieved, such as a gravure coater method.

The solvent for the filler-containing solution or the heat-resistant resin solution is not particularly limited but is preferably a solvent which can be removed from the solution applied to the polyolefin microporous membrane. Specific examples include N-methylpyrrolidone, N,N-dimethylformamide, N,N-dimethylacetamide, water, ethanol, toluene, heated xylene, methylene chloride, and hexane.

The method of removing the solvent is not particularly limited as long as the method does not have an adverse effect on the polyolefin microporous membrane. Specific examples include a method of drying the polyolefin microporous membrane at a temperature lower than or equal to the melting point thereof while immobilizing the polyolefin microporous membrane, a method of drying the polyolefin microporous membrane under reduced pressure, and a method of immersing the polyolefin microporous membrane in a poor solvent of the resin binder or the heat-resistant resin to coagulate the resin and simultaneously extract the solvent.

The thickness of the porous layer is preferably not less than 0.5 μm and not greater than 100 μm from the perspective of enhancing the heat resistance.

In the multi-layer porous membrane of the present invention, the proportion of the thickness of the porous layer relative to the thickness of the multi-layer porous membrane may be adjusted appropriately before use in accordance with the purpose. Specifically, the proportion is preferably not less than 15% and not greater than 80% and more preferably not less than 20% and not greater than 75%.

In addition, the porous layer may be formed on one surface of the multi-layer porous membrane or may be formed on both surfaces thereof.

4. Battery Separator

The polyolefin microporous membrane of the present invention can be suitably used in a battery using an aqueous electrolytic solution or a battery using a non-aqueous electrolytic solution. Specifically, the polyolefin microporous membrane can be preferably used as a separator for a rechargeable battery such as a nickel-hydrogen battery, a nickel-cadmium battery, a nickel-zinc battery, a silver-zinc battery, a lithium rechargeable battery, or a lithium polymer rechargeable battery. Of these, the polyolefin microporous membrane is preferably used as a separator for a lithium ion rechargeable battery in which a non-aqueous electrolyte is used.

In a lithium ion rechargeable battery, a positive electrode and a negative electrode are laminated with a separator interposed therebetween, and the separator contains an electrolytic solution (an electrolyte). The electrode structure is not particularly limited, and a conventionally known structure may be used. Examples of the electrode structure include an electrode structure in which a disc-shaped positive electrode and a negative electrode are placed to face each other (coin type), an electrode structure in which planar positive electrodes and negative electrodes are alternately laminated (lamination type), an electrode structure in which a laminated band-shaped positive electrode and negative electrode are wound (winding type).

The current collector, positive electrode, positive electrode active material, negative electrode, negative electrode active material, and electrolytic solution used in the lithium ion rechargeable battery are not particularly limited, and conventionally known materials may be appropriately used in combination.

Note that the present invention is not limited to the above embodiments, and various modifications may be added within the scope of the present invention.

EXAMPLES

The present invention will be described in further detail using examples below, but the embodiments of the present invention are not limited to these examples. Note that the evaluation methods, each of the analysis methods, and the materials used in the examples are as follows.

Evaluation Methods and Analysis Methods (1) Membrane Thickness (μm)

The membrane thicknesses of five points of the microporous membrane within a range of 95 mm×95 mm were measured with a contact thickness meter (Litematic, manufactured by Mitutoyo Corporation), and the average value of the membrane thicknesses was determined.

(2) Porosity (%)

The porosity was determined using the following equation, in which the weight $w_1$ of the microporous membrane and the weight $w_2$ of an equivalent polymer having no pores (polymer having the same width, length, and composition) were compared.

$$\text{Porosity (\%)} = (w_2 - w_1)/w_2 \times 100$$

(3) Air Permeation Resistance (sec/100 cc)

The air permeation resistance P1 was measured for a microporous membrane having a membrane thickness T1 using an air permeability meter (EGO-1T, manufactured by Asahi Seiko Co., Ltd.). Furthermore, the air permeation resistance P2 at a membrane thickness of 20 μm was calculated from the equation: P2=(P1×20)/T1.

(4) Maximum Pore Size and Mean Flow Pore Size (nm)

The maximum pore size and the mean flow pore size were measured in the order of Dry-up and Wet-up using a perm porometer (CFP-1500A, manufactured by PMI). For Wet-up, pressure was applied to a microporous membrane sufficiently immersed in Galwick (trade name), manufactured by PMI which has a known surface tension, and the pore size converted from the pressure at which air begins to pass through the membrane was used as the maximum pore size.

For the mean flow pore size, the pore size was converted from the pressure at a point of intersection between a curve with ½ the slope of a curve of pressure and flow rate in the Dry-up measurement and the curve in the Wet-up measurement. The following equation was used for the conversion of pressure and pore size.

$$d = C \cdot \gamma / P$$

In the equation above, "d (μm)" is the pore size of the microporous membrane; "γ (mN/m)" is the surface tension of the liquid; "P (Pa)" is the pressure; and "C" is a constant.

(5) Impedance ($\Omega \cdot cm^2$)

The impedance was measured using an impedance measuring instrument (SI1250, SI1287, manufactured by Solartron). The impedance at 1.0 kHz ($\Omega \cdot cm^2$) was determined in the measurement condition of 10 mA by performing a measurement by placing, in between electrodes which was provided with an Ni foil (30 mm×20 mm) on a glass plate (50 mm (W)×80 mm (L)×3 mm (T)), a microporous membrane (30 mm (W)×20 mm (L)) and 0.02 mL of an electrolytic solution using 1 mol/L of $LiPF_6$ with ethylene carbonate:ethyl methyl carbonate=(4:6) as a solvent.

(6) Weight Average Molecular Weight (Mw)

The Mw of PP, UHMWPE and HDPE were determined by gel permeation chromatography (GPC) under the following conditions.

Measurement instrument: GPC-150C, manufactured by Waters Corporation
Column: Shodex UT806M, manufactured by Showa Denko, K. K.
Column temperature: 135° C.
Solvent (mobile phase): o-dichlorobenzene
Solvent flow rate: 1.0 mL/min
Sample concentration: 0.1 wt. % (dissolution condition: 135° C./1 h)
Injection quantity: 500 μL
Detector: differential refractometer manufactured by Waters Corporation (RI detector)
Calibration curve: created using predetermined conversion constant from calibration curve obtained using monodisperse polystyrene standard sample (7) Dielectric Breakdown Voltage A microporous membrane that had been cut out into a circle with a diameter of 60 mm and a membrane thickness T1 was placed on a square aluminum plate in which each side was 150 mm. A cylindrical electrode made from brass and having a diameter of 50 mm, a height of 30 mm, and a weight of 500 g was placed thereon and then was connected with TOS5051A, dielectric breakdown resistance characteristics tester, manufactured by Kikusui Electronics Corporation. The voltage was applied at a rate of voltage increase of 0.2 kV/sec, and a value V1 at which dielectric breakdown occurred was determined. Fifteen measurements of the dielectric breakdown voltage were performed for each to obtain the maximum value, the average value, and the minimum value.

(8) Oxidation Resistance

To evaluate the oxidation resistance of the polyolefin microporous membrane, the polyolefin microporous membrane was incorporated into an electrochemical cell including an anode, a cathode, a separator, and an electrolyte, as the separator to perform an accelerated overcharge test.

A cathode in which $LiCoO_2$ having a density of 3.55 g/cm$^3$ was laminated on an aluminum substrate having a width of 40 mm, a length of 40 mm, and a thickness of 15 μm in a mass per unit area of 13.4 mg/cm$^2$, and an anode in which natural graphite having a density of 1.65 g/cm$^3$ was laminated on a copper film substrate having a width of 45 mm, a length of 45 mm, and a thickness of 10 μm in a mass per unit area of 5.5 mg/cm$^2$ were used. The anode and the cathode were used after being dried in a vacuum oven at 120° C. As the separator, the polyolefin microporous membrane having a length of 50 mm and a width of 60 mm was used after being dried in a vacuum oven at 50° C. The electrolyte was prepared by dissolving 1 M of $LiPF_6$ in a mixture of ethylene carbonate and ethyl methyl carbonate (3/7, V/V). The anode, the separator, and the cathode were stacked and the separator was impregnated with the electrolyte. The obtained laminate was subjected to vacuum sealing in an aluminum laminate to be tightly sealed, and thus the electrochemical cell was produced.

The produced electrochemical cell was charged with a constant current of 0.5 C up to the voltage of 4.3 V, and then charged with a constant voltage of 4.3 V at a temperature of 60° C. for 200 hours.

After the battery was disassembled, the separator was taken out to remove attached substances by washing the separator for 1 hour each in diethyl carbonate, ethanol, N-methylpyrrolidone, and 1 N of hydrochloric acid. Thereafter, the separator was dried in the air, and discoloration on the cathode (positive electrode) contact surface of the separator was visually observed to evaluate the oxidation resistance. The evaluation was performed based on the proportion of area of the discolored portion relative to the entire area of the separator. The evaluation result was recorded as described below.

Less than 5%: Excellent
5% or greater but less than 10%: Good
From 10% to 20%: Marginal
20% or greater: Poor (9) Pore Size of Pore Opening of Microporous Membrane Surface (Maximum Pore Size on Surface)

The surface of the polyolefin microporous membrane was observed by SEM using a JSM-6701F scanning electron microscope (SEM), manufactured by JEOL Ltd. For the observed pore openings in the range of 5 μm×5 μm, the length of the longest pore size of openings was measured as a major axis 1, and the length of the longest pore size in a direction orthogonal to the major axis was measured as a major axis 2. The maximum values among the measured major axes 1 was used as the maximum pore size. Along with this, the major axis 2 which corresponded to the maximum pore size was also measured.

(10) β-Crystal Melting Peak

The crystal melting peak derived from the β-crystal of the polyolefin microporous membrane was measured by, using a differential scanning calorimeter, increasing the temperature of the polyolefin microporous membrane from 25° C. to 240° C. at a scanning rate of 10° C./min and then maintaining the temperature for 1 minute, then decreasing the temperature from 240° C. to 25° C. at a scanning rate of 10° C./min and then maintaining the temperature for 1 minute, and then increasing the temperature again from 25° C. to 240° C. at a scanning rate of 10° C./min, and recording the change over time of the difference in heat flow between a sample and a reference substance when the temperature was increased again. The case where the crystal melting peak derived from the β-crystal was observed in the lower temperature side of the crystal melting peak derived from the α-crystal was evaluated as "present", and the case where the crystal melting peak was not observed was evaluated as "absent".

Example 1

In the twin-screw extruder, 24.75 parts by mass of the ultrahigh molecular weight polypropylene (UHMWPP) having a weight average molecular weight (Mw) of 2.6×10$^6$ and a molecular weight distribution (Mw/Mn) of 6.2 and 0.25 parts by mass of a nucleating agent NA-11 (manufactured by Adeka Corporation; aromatic metal phosphate-based nucleating agent) were charged, and 75.00 parts by mass of liquid paraffin was supplied from a side feeder of the twin-screw extruder. The mixture was melt-kneaded in a condition at 180° C. and 200 rpm to prepare a polypropylene resin solution in the twin-screw extruder. Thereafter, the polypropylene resin solution was extruded from a sheet forming die installed at the tip of the twin-screw extruder, and the obtained sheet-like extrudate was taken by a cooling roller at 25° C. to form a gel sheet. The gel sheet was then biaxially-stretched at 120° C. in a manner that the gel sheet was stretched 5×5 times, and then immersed into methylene chloride at 25° C. to remove the liquid paraffin. After the gel sheet was dried in the air at room temperature, the gel sheet was subjected to heat treatment at 125° C. for 10 minutes to prepare a polypropylene microporous membrane. Characteristics of the obtained microporous membrane were shown in Table 1.

Examples 2, 3, and 4

Polypropylene microporous membranes were obtained in the same manner as in Example 1 except for changing the temperature during the simultaneous biaxially-stretching to 130° C. in Example 2, 140° C. in Example 3, or 145° C. in Example 4. Characteristics of the obtained microporous membrane were shown in Table 1.

Example 5

A polyolefin microporous membrane was obtained in the same manner as in Example 1 expect for charging 23.50 parts by mass of the ultrahigh molecular weight polypropylene (UHMWPP) having a weight average molecular weight (Mw) of $2.60 \times 10^6$ and a molecular weight distribution (Mw/Mn) of 6.2, 1.25 parts by mass of high-density polyethylene (HDPE) having a weight average molecular weight (Mw) of $5.72 \times 10^5$ and a molecular weight distribution (Mw/Mn) of 4.81, and 0.25 parts by mass of a nucleating agent NA-11 (manufactured by Adeka Corporation) in a twin-screw extruder, and then supplying 75 parts by mass of liquid paraffin from a side feeder of the twin-screw extruder. Characteristics of the obtained microporous membrane were shown in Table 1.

Example 6

A polyolefin microporous membrane was obtained in the same manner as in Example 1 expect for charging 24.25 parts by mass of the ultrahigh molecular weight polypropylene (UHMWPP) having a weight average molecular weight (Mw) of $2.60 \times 10^6$ and a molecular weight distribution (Mw/Mn) of 6.2 and 0.75 parts by mass of L-MODU (manufactured by Idemitsu Kosan Co., Ltd.) as a crystallization retarder in a twin-screw extruder, supplying 75 parts by mass of liquid paraffin from a side feeder of the twin-screw extruder, and changing the stretching temperature to 130° C. Characteristics of the obtained microporous membrane were shown in Table 2.

Example 7

A polyolefin microporous membrane was obtained in the same manner as in Example 6 except for changing the stretching temperature to 140° C. Characteristics of the obtained microporous membrane were shown in Table 2.

Note that the mean flow pore sizes of the microporous membranes obtained in Examples 1, 2, 3, 5, 6, and 7 were less than or equal to the measurement limit of the porometer (14.2 nm). In Tables 1 and 2, the results were recorded as "14.2 nm or less".

Comparative Example 1

A monolayered microporous membrane formed from polypropylene that was produced by dry uniaxial stretching was evaluated, and the characteristics are shown in Table 2.

Comparative Example 2

A polyolefin microporous membrane was obtained in the same manner as in Example 1 expect for charging 30.00 parts by mass of polyethylene resin composition formed from 30.00 parts by mass of the ultrahigh molecular weight polyethylene (UHMWPE) having a weight average molecular weight Mw of $2.89 \times 10^6$ and a molecular weight distribution Mw/Mn of 5.28 and 70.00 parts by mass of high-density polyethylene (HDPE) having a weight average molecular weight Mw of $5.72 \times 10^5$ and a molecular weight distribution Mw/Mn of 4.81 in a twin-screw extruder, and then supplying 70.00 parts by mass of liquid paraffin from a side feeder of the twin-screw extruder and changing the stretching temperature to 115° C. Characteristics of the obtained microporous membrane were shown in Table 2.

Comparative Example 3

A polyolefin microporous membrane was obtained in the same manner as in Example 1 expect for charging 17.33 parts by mass of the ultrahigh molecular weight polypropylene (UHMWPP) having a weight average molecular weight (Mw) of $2.60 \times 10^6$ and a molecular weight distribution (Mw/Mn) of 6.2, 7.42 parts by mass of high-density polyethylene (HDPE) having a weight average molecular weight (Mw) of $5.72 \times 10^5$ and a molecular weight distribution (Mw/Mn) of 4.81, and 0.25 parts by mass of a nucleating agent NA-11 (manufactured by Adeka Corporation) in a twin-screw extruder, and then supplying 75.00 parts by mass of liquid paraffin from a side feeder of the twin-screw extruder. Characteristics of the obtained microporous membrane were shown in Table 2.

TABLE 1

|  |  | Example 1 | Example 2 | Example 3 | Example 4 | Example 5 |
|---|---|---|---|---|---|---|
| UHMwPP | (Mass %) | 100 | 100 | 100 | 100 | 95 |
| HDPE | (Mass %) | 0 | 0 | 0 | 0 | 5 |
| UHMwPE | (Mass %) | 0 | 0 | 0 | 0 | 0 |
| Stretching temperature | (° C.) | 120 | 130 | 140 | 145 | 120 |
| Membrane thickness | (μm) | 20.8 | 22.7 | 25.1 | 25.4 | 17 |
| Porosity % | (%) | 37.4 | 40.5 | 49.2 | 50.6 | 34.5 |
| Air permeation resistance at 20 μm | (sec/100 cc) | 2290 | 1382 | 514 | 398 | 2061 |
| Mean flow pore size | (nm) | 14.2 or less | 14.2 or less | 14.2 or less | 15 | 14.2 or less |
| Maximum pore size | (nm) | 18.8 | 20.8 | 24 | 28.9 | 20.7 |
| Maximum opening on surface | Major axis 1 | 120 | 100 | 130 | 150 | 150 |
| (nm) | Major axis 2 | 70 | 70 | 110 | 70 | 140 |

TABLE 1-continued

|  |  | Example 1 | Example 2 | Example 3 | Example 4 | Example 5 |
|---|---|---|---|---|---|---|
| Impedance | (Ω · cm²) | 13.3 | 8.6 | 7.2 | 6.3 | 11.1 |
| Withstand voltage performance (kV/μm) | Minimum value | 0.16 | 0.17 | 0.15 | 0.14 | 0.17 |
|  | Average value | 0.21 | 0.19 | 0.18 | 0.18 | 0.21 |
|  | Maximum value | 0.24 | 0.20 | 0.19 | 0.20 | 0.25 |
| Oxidation resistance |  | Excellent | Excellent | Excellent | Excellent | Excellent |
| β-Crystal melting peak |  | Absent | Absent | Absent | Absent | Absent |

TABLE 2

|  |  | Example 6 | Example 7 | Comparative Example 1 | Comparative Example 2 | Comparative Example 3 |
|---|---|---|---|---|---|---|
| UHMwPP | (Mass %) | 100 | 100 | 0 | — | 70 |
| HDPE | (Mass %) | 0 | 0 | 70 | — | 30 |
| UHMwPE | (Mass %) | 0 | 0 | 30 | — | 0 |
| Stretching temperature | (° C.) | 130 | 140 | 115 | — | 120 |
| Membrane thickness | (μm) | 18.8 | 21.1 | 24 | 20 | 13.9 |
| Porosity % | (%) | 32.2 | 44.2 | 40 | 45 | 33 |
| Air permeation resistance at 20 μm | (sec/100 cc) | 3346 | 893 | 500 | 250 | 1787 |
| Mean flow pore size | (nm) | 14.2 or less | 14.3 | 20 | 22.7 | 14.2 or less |
| Maximum pore size | (nm) | 27 | 20.1 | 30 | 40.3 | 37.7 |
| Maximum opening on surface (nm) | Major axis 1 | 100 | 110 | 400 | 140 | 140 |
|  | Major axis 2 | 70 | 100 | 80 | 130 | 70 |
| Impedance | (Ω · cm²) | 12.2 | 7.9 | 7.3 | 8.2 | 9.2 |
| Withstand voltage performance (kV/μm) | Minimum value | 0.17 | 0.13 | 0.06 | 0.14 | 0.15 |
|  | Average value | 0.20 | 0.15 | 0.10 | 0.15 | 0.21 |
|  | Maximum value | 0.22 | 0.18 | 0.12 | 0.15 | 0.25 |
| Oxidation resistance |  | Excellent | Excellent | Excellent | Poor | Good |
| β-Crystal melting peak |  | Absent | Absent | Present | Absent | Absent |

INDUSTRIAL APPLICABILITY

Since the polyolefin microporous membrane according to the present invention has excellent impedance characteristics, and excellent oxidation resistance and withstand voltage characteristics, in particular, the polyolefin microporous membrane can be suitably used in a rechargeable battery, such as a non-aqueous electrolyte rechargeable battery which is representatively exemplified by a lithium ion rechargeable battery.

The invention claimed is:

1. A polyolefin microporous membrane comprising a polyolefin resin, wherein the polyolefin resin contains at least 80 mass % polypropylene resin, and wherein the polyolefin microporous membrane has a maximum pore size of less than 30.0 nm and a mean pore size of less than 20.0 nm.

2. The polyolefin microporous membrane according to claim 1, wherein the polyolefin resin contains at least 90 mass % polypropylene resin, and an impedance of the polyolefin microporous membrane is no greater than 15.0 Ω·cm².

3. The polyolefin microporous membrane according to claim 1, wherein the maximum pore size on a surface of the polyolefin microporous membrane is 300 nm or less.

4. The polyolefin microporous membrane according to claim 1, wherein an average molecular weight of the polypropylene resin is between about $1 \times 10^5$ and about $1 \times 10^8$.

5. The polyolefin microporous membrane according to claim 1, wherein a porosity of the polyolefin microporous membrane is between about 20% and about 80%.

6. The polyolefin microporous membrane according to claim 1, wherein, a membrane thickness of the polyolefin microporous membrane is 20 and an air permeation resistance of the polyolefin microporous membrane is 300 sec/100 cc or greater.

7. A battery separator comprising a polyolefin microporous membrane comprising a polyolefin resin, wherein the polyolefin resin contains at least 80 mass % polypropylene resin, wherein the polyolefin microporous membrane has a maximum pore size of less than 30.0 nm and a mean pore size of less than 20.0 nm.

8. The battery separator according to claim 7, wherein the battery separator is a non-aqueous electrolyte rechargeable battery separator.

9. A rechargeable battery comprising a battery separator comprising a polyolefin microporous membrane comprising a polyolefin resin, wherein the polyolefin resin contains at least 80 mass % polypropylene resin, wherein the polyolefin microporous membrane has a maximum pore size of less than 30.0 nm and a mean pore size of less than 20.0 nm.

* * * * *